April 3, 1951 L. R. J. JOHNSON ET AL 2,547,213

NEGATIVE FEEDBACK AMPLIFIER

Filed April 22, 1947

INVENTORS
LEONARD R. J. JOHNSON,
DENNIS G. HOLLOWAY,
& ERIC L. C. WHITE

BY H. S. Grover
ATTORNEY

Patented Apr. 3, 1951

2,547,213

UNITED STATES PATENT OFFICE 2,547,213

NEGATIVE FEEDBACK AMPLIFIER

Leonard Reginald Joffre Johnson, Harlington, Dennis Godson Holloway, Maidenhead, and Eric Lawrence Casling White, Iver, England, assignors to Electric & Musical Industries Limited, Hayes, England, a company of Great Britain Application April 22, 1947, Serial No. 743,096
In Great Britain May 17, 1946

1 Claim. (Cl. 179—171)

This invention relates to electric circuit arrangements.

In circuit arrangements such as are employed in thermionic valve amplifiers for amplifying signals extending over a wide frequency range it may be necessary to employ an impedance element which has a distributed shunt capacity. For example, in an amplifier for amplifying signals such as are generated by a television transmitting tube, for instance, that known by the registered trade-mark "Emitron," the output electrode of the transmitting tube has a certain capacity to earth and likewise the input circuit of the amplifier also has a capacity to earth. The signals from the transmitting tube are developed across a load resistance and in order to obtain the best signal-to-noise ratio the value of the load resistance is chosen to be more than ten times the reactance of the capacity to earth of said output electrode and the input circuit of the amplifier at the cutoff frequency. Generally, it is required that the value of the load resistance should be about one megohm. Such a high value of load resistance results in the input of the amplifier being frequency-dependent and in order to overcome such defect it has been suggested to apply negative feedback to the load resistance in such a way as to effectively reduce the value thereof. It is found, however, that even with an optimum degree of feedback the circuit is still frequency-dependent and this we have found is due to the load resistance which also has a distributed shunt capacity to earth which thus causes the load resistance itself to be frequency-dependent.

According to the present invention there is provided a circuit arrangement comprising an impedance element arranged to be fed with fluctuating current and having series impedance and distributed shunt capacity, and wherein means are provided for rendering said distributed shunt capacity substantially ineffective in said circuit.

In one embodiment of the invention said impedance element is associated with a screen to which a similar fluctuating current is also arranged to be fed, the arrangement being such that when said currents flow in said element and said screen the potential gradients set up by said screen and said impedance element are substantially the same so that said distributed shunt capacity is rendered substantially ineffective in said circuit.

According to a feature of the invention there is provided a thermionic valve amplifier having a load resistance of high value in the input circuit of the amplifier arranged to be fed with fluctuating current and wherein, in order to reduce the effective value of said resistance, negative feedback is applied thereto and wherein said load resistance has distributed shunt capacity and is associated with a screen to which a similar fluctuating current is also arranged to be fed, the arrangement being such that when said currents flow in said resistance and said screen the potential gradients set up by said screen and said resistance are substantially the same so that said distributed shunt capacity is rendered substantially ineffective in said circuit.

According to another embodiment of the invention where the impedance element is employed in a feedback path said distributed shunt capacity can be rendered substantially ineffective by applying an additional feedback potential or potentials to one or more different points in said element.

According to a further feature of the invention there is provided a thermionic valve amplifier having a load resistance of high value in the input circuit of said amplifier and wherein in order to reduce the effective value of said resistance negative feedback is applied thereto and wherein said load resistance has distributed shunt capacity which is rendered substantially ineffective in said circuit by applying an additional feedback potential or potentials to one or more different points in said load resistance.

In order that the said invention may be clearly understood and readily carried into effect, it will now be more fully described with reference to the drawings, in which.

The invention is particularly applicable to the amplifiers hereinbefore referred to for amplifying signals generated in a television transmitting tube such as a tube known by the registered trade-mark "Emitron" and will be described by way of example as applied to such amplifiers.

Figure 1:
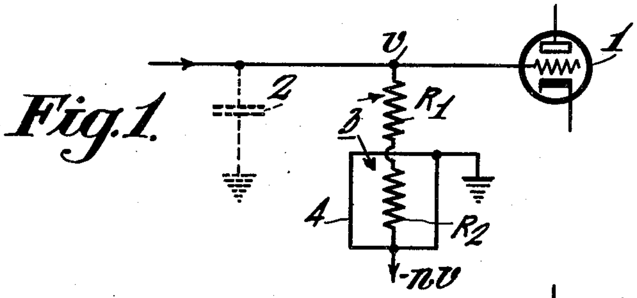
Figure 1 is a circuit according to one embodiment of the invention.

Referring to Figure 1 of the drawings, the capacity to earth of the output electrode of the transmitting tube and the capacity to earth of the input circuit of the amplifier shown as a valve 1 is represented by the condenser 2 indicated in dotted lines. The load resistance is indicated by the reference numeral 3 and the lower end of the resistance 3 has applied thereto negative feedback from the amplifier 1 in such a way as to reduce the effective value of the resistance 3. The load resistance 3 has, however, a distributed shunt capacity to earth and in order to reduce the effect of such distributed capacity the resistance 3 is in effect divided into two resistances $R_1$ and $R_2$ such that the junction point of the resistances $R_1$ and $R_2$ is at zero A. C. potential at low frequencies. If the voltage existing at the input to the amplifier 1 is $v$ and the feedback is $-nv$, then $$R_1=\frac{R}{n+1}$$

and $$R_2=\frac{nR}{n+1}$$

The resistance $R_2$ is surrounded by a low impedance conducting screen connected effectively in shunt with the resistance $R_2$ and earthed at its upper end so that the distributed capacity of the resistance $R_2$ is to the screen instead of to earth. The resistance 3 may be in the form of a rod having a reasonably uniformly distributed resistance a portion of the rod projecting from the screen 4 and constituting the resistance $R_1$. The screen 4 may be in the form of a solenoid resistance winding which is wound preferably non-inductively or a cylinder of semi-conducting material, such as carbon or mixtures containing carbon, the arrangement being such that the potential gradients of the resistance $R_2$ and the screen 4 are the same and hence the distributed capacities have substantially zero voltage across them so that their effect is substantially removed.

Figure 2:
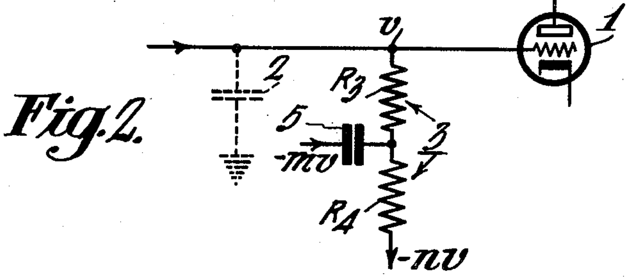
Figure 2 illustrates a circuit according to another form of the invention.

The value of the resistance 3 is determined by considerations of microphony and other low-frequency disturbances produced by the television transmitting tube and the amplifier, and hence, so long as the resistance 3 is employed at its high value over the low frequency band, then its effective value can be altered outside this band. Consequently, it is only necessary to compensate for the distributed capacity of the resistance 3 when the latter becomes frequency-dependent which does not occur when the value of the resistance 3 is equal to one megohm until frequencies of the order of 100 kc. are encountered. These considerations enable an alternative form of the invention to be employed, as shown in Figure 2. In this figure the resistance 3 is actually divided into two resistances $R_3$ and $R_4$, the lower limit of the resistance $R_3$ being decided by high frequency signal-to-noise considerations. Negative feedback is applied to the junction point of the resistances $R_3$ and $R_4$ through a condenser 5, the feedback voltage applied through the condenser 5 being similar to that applied to the lower end of the resistance $R_4$ but is smaller in magnitude. If the feedback voltage applied through the condenser 5 is $-mv$ the value of $m$ is given by $$\frac{1+m}{R_3}=\frac{n-m}{R_4}$$

or $$m=\frac{nR_3+R_4}{R_3+R_4}$$

The value of the condenser 5 is chosen so that over the low-frequency band where the full value of the resistance 3 is required, its reactance is so high that the feedback applied through the condenser is negligible. At higher frequencies the reactance of the condenser 5 is sufficiently low so as to effectively connect the junction point of the resistances $R_3$ and $R_4$ to the feedback source $-mv$. The negative feedback applied to the lower end of the resistance 3 may be obtained from the output of the amplifier whilst the feedback applied through condenser 5 which must be derived from a source of low impedance may be obtained from a potential divider arranged across the output of the amplifier or from a previous stage in the amplifier. If desired, the resistance $R_4$ could be further divided and connected to low impedance feedback sources of appropriate values.

Figure 3:
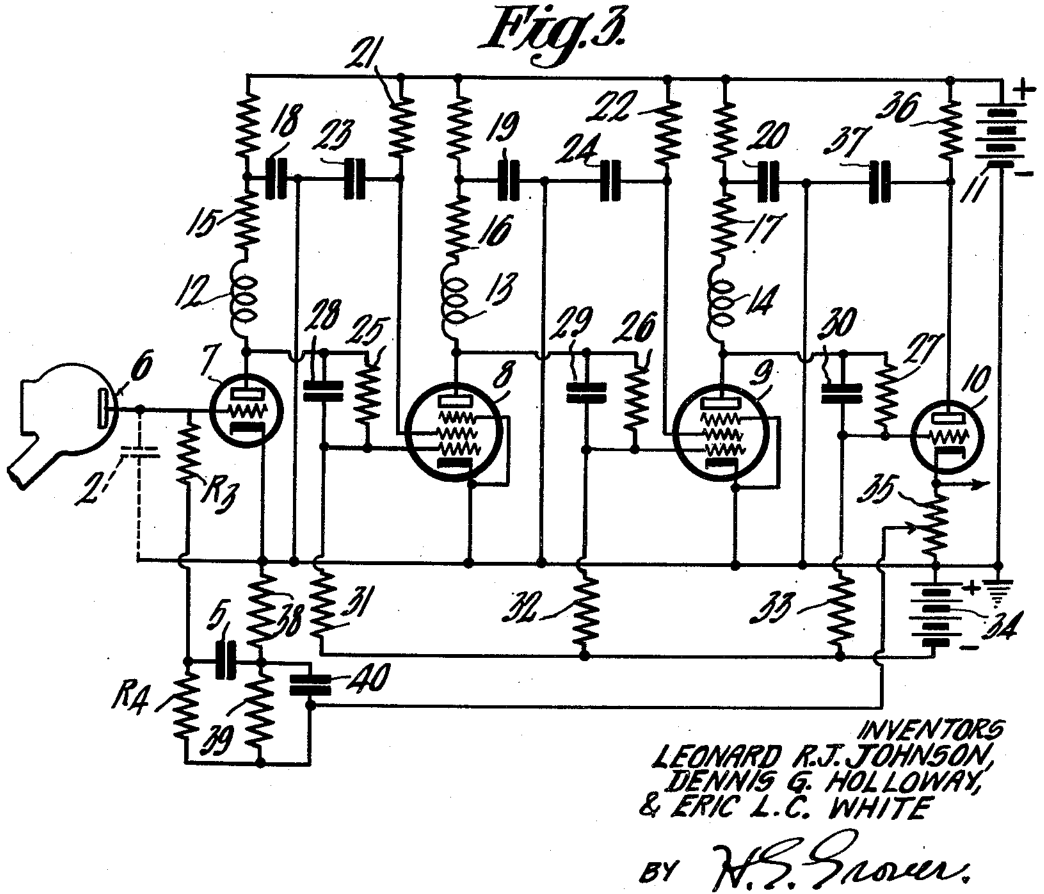
Figure 3 illustrates a circuit of an amplifier embodying the form of the invention shown in Figure 2.

Figure 3 of the drawings illustrates the circuit shown in Figure 2 as applied to what is generally called the head amplifier of a television transmitter. In this figure the reference numeral 6 indicates the television transmitting tube and the amplifier comprises four amplifying stages each including a valve 7, 8, 9 and 10. Each of the valves 7, 8, 9 and 10 have their anodes connected to a source of anode current indicated by the reference numeral 11 and the valves 7, 8 and 9 are connected to said source through chokes 12, 13 and 14 and resistances 15, 16 and 17 respectively, the resistances being decoupled to earth through decoupling condensers 18, 19 and 20. The valve 7 is shown as a triode valve it being preferable to employ such a valve in the first stage of the amplifier owing to its low shot noise whilst the valves 8 and 9 are shown as pentode valves, the screening grids of said valves being connected to the source 11 through the resistances 21 and 22 which are decoupled to earth through condensers 23 and 24. The couplings between the valves 7, 8, 9 and 10 are shown as D. C. couplings afforded by the resistances 25, 26 and 27 shunted by condensers 28, 29 and 30, the control electrodes of the valves 8, 9 and 10 being biassed through resistances 31, 32 and 33 from a source 34. A. C. couplings may if desired be employed. The valve 10 is shown as a cathode follower having an output resistance 35 so as to afford a low impedance for feeding to a further amplifier, usually via a long cable, the anode of the valve 10, as shown, being connected to the source 11 through a resistance 36 and being decoupled through condenser 37. Negative feedback potentials for application to the lower end of the resistance $R_4$ are derived from a variable tapping point on the resistance 35 so as to enable the amount of feedback to be varied to allow for variation in the characteristics of the valves. The junction point of the resistances $R_3$ and $R_4$ is connected through condenser 5 to a point on a potential divider comprising resistances 38 and 39 which provide an appropriate degree of negative feedback for application to the junction point of the resistances $R_3$ and $R_4$. In some amplifiers the point from which feedback potentials are applied to the resistances $R_3$ and $R_4$ may be some distance away from the latter resistances and in such a case the feedback leads will preferably be in the form of coaxial lines which may be suitably terminated to reduce reflections. It is desirable to introduce a certain amount of phase advance in the feedback applied through the condenser 5 to counteract the phase lag in the amplifier and such phase advance may be achieved by means of a condenser 40 shunted across the resistance 39. The potential of the junction between resistances $R_3$ and $R_4$ is not a real fraction of the feedback potential at high frequencies, due to the input stray capacity 2. Consequently a slight improvement may be made by inserting a shunting condenser between the earthed end of the resistance 38 and a point intermediate its ends, the value of the shunting condenser and the position of the intermediate point and the magnitude of the resistance 38 being so chosen that the potential at the junction of resistances 39 and 38 is equal to that which would exist at the junction of resistances $R_3$ and $R_4$ in the absence of distributed capacity from resistances $R_3$ and $R_4$ to earth.

We claim:

An electric circuit comprising an amplifier having at least a grid and a cathode, said cathode being connected to a fixed potential, a source of negative feedback potential, a first impedance and a second impedance connected in series between said source and said cathode, a third impedance and a fourth impedance connected in series between said source and said grid, a condenser connected between said source and the junction of said first and second impedances, and another condenser connected between the junction of said first and second impedances and the junction of said third and fourth impedances.

LEONARD REGINALD JOFFRE JOHNSON.
DENNIS GODSON HOLLOWAY.
ERIC LAWRENCE CASLING WHITE.

REFERENCES CITED

The following references are of record in the file of this patent:

UNITED STATES PATENTS

| Number | Name | Date |
|---|---|---|
| 2,282,319 | Brown | May 12, 1942 |
| 2,302,798 | Percival | Nov. 24, 1942 |
| 2,317,025 | Bond | Apr. 20, 1943 |